Patented June 15, 1926.

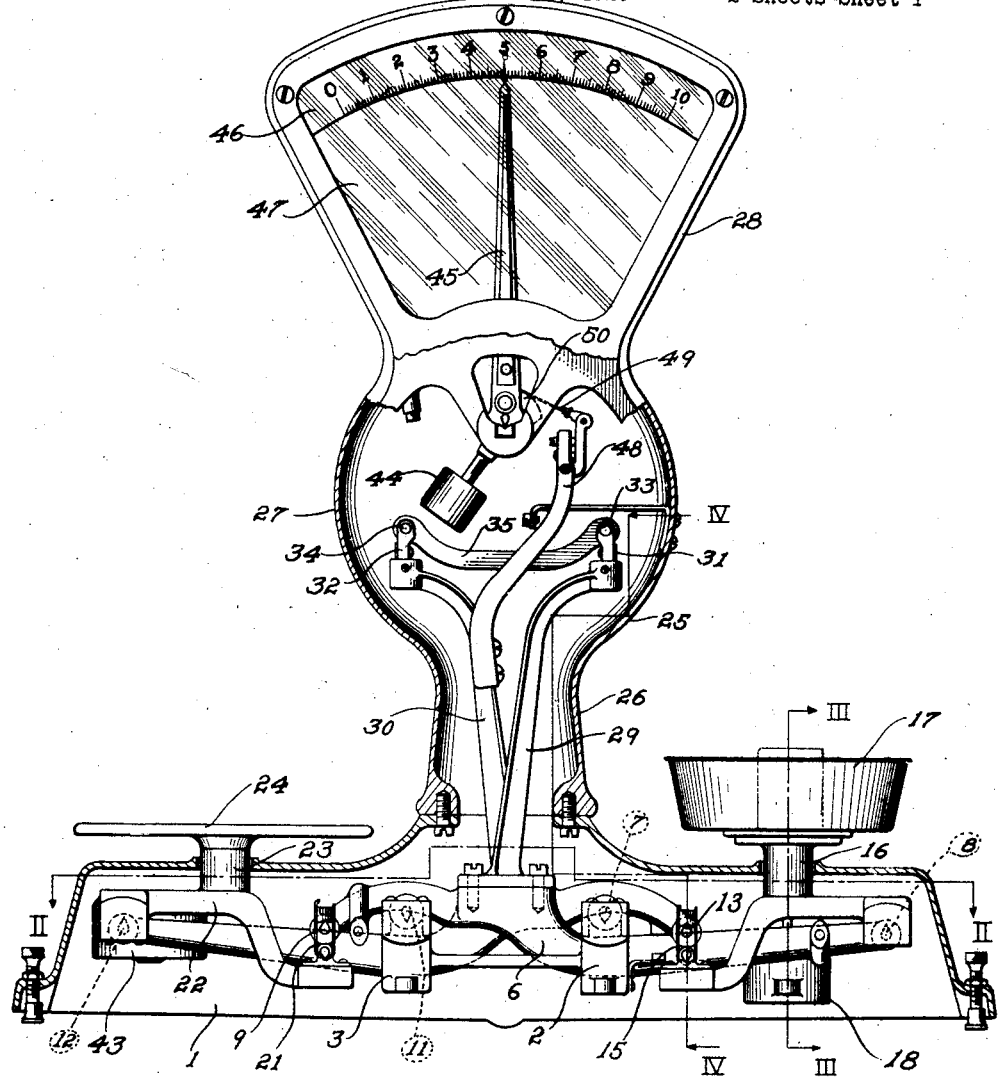

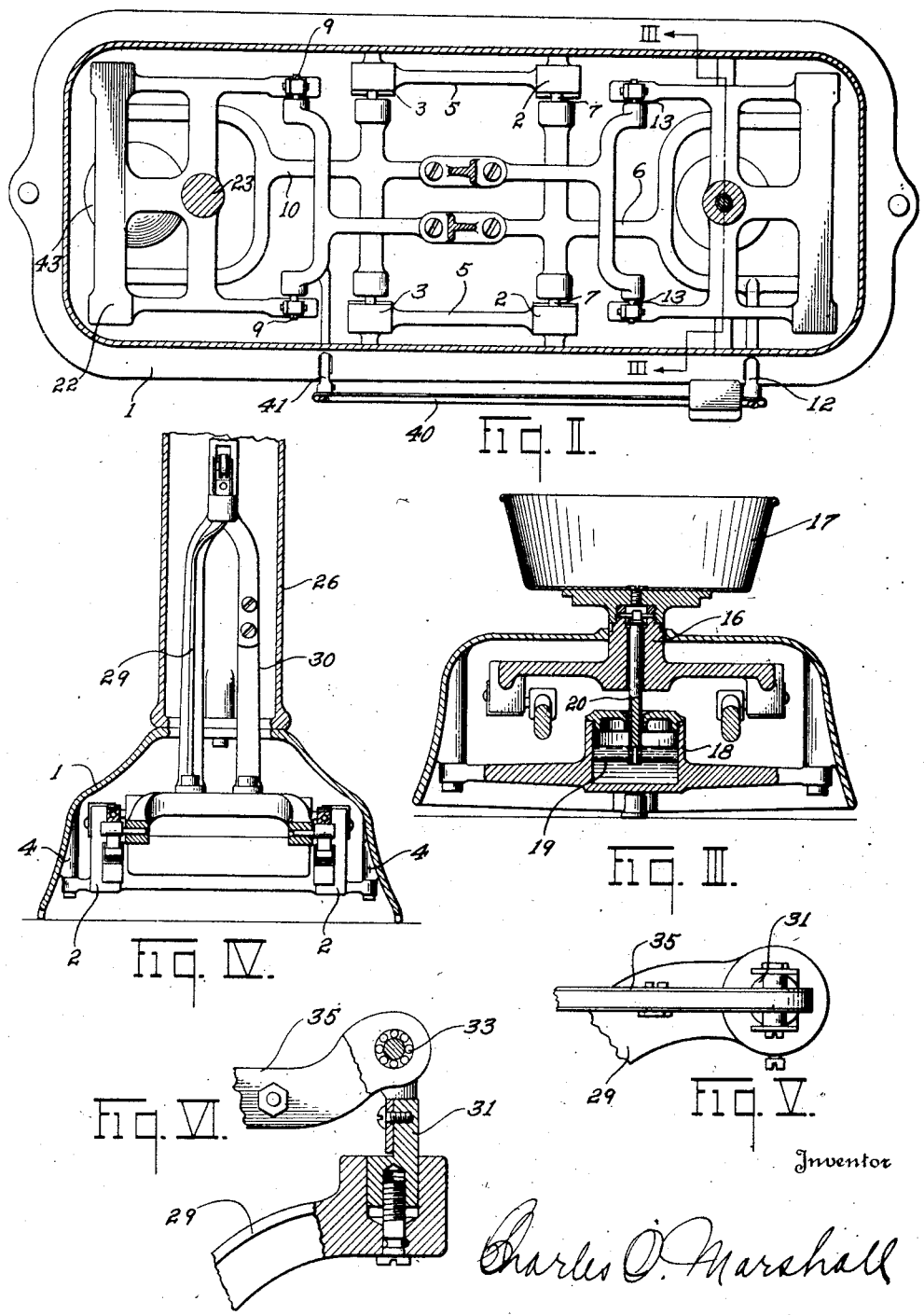

1,588,462

UNITED STATES PATENT OFFICE.

CHARLES O. MARSHALL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 14, 1923. Serial No. 618,901.

This invention relates to weighing scales, and particularly to scales of the so-called lighthouse type having a commodity-receiving pan and a weight-receiving pan with automatic load-counterbalancing mechanism supported in an upright housing between them, and one of its principal objects is the provision of lever mechanism for a scale of this type which is so constructed and arranged that the pivots of the levers which support the commodity-receiver and weight-receiver remain in the same horizontal plane and remain the same distance apart throughout the weighing movements of the mechanism.

Another object of the invention is the provision of platform lever mechanism in which the parts all move in the same direction during weighing movements.

Another object is the provision of a weighing scale of the so-called lighthouse type in which the commodity-receiver and the weight-receiving platter are held against tilting during weighing movements without the use of check links or check link risers.

Other objects and advantages will be apparent from the following description, in which reference is had to the subjoined claims illustrating a preferred embodiment of my invention and wherein similar reference numerals designate similar parts throughout the several views.

In the drawings:—

Figure I is a front elevational view of a scale embodying my invention, part of the housing being broken away to show the mechanism;

Figure II is a sectional plan view taken substantially on the line II—II of Figure I;

Figure III is a sectional elevation taken substantially on the line III—III of Figure II;

Figure IV is a sectional elevational view taken substantially on the line IV—IV of Figure I;

Figure V is an enlarged fragmentary plan view showing a joint in a connection between the levers; and Figure VI is an elevational view of the joint shown in Figure V, parts being broken away and parts shown in section.

Referring to the drawings in detail, the base 1 of the scale constitutes a housing for the platform lever mechanism which is supported upon two pairs of fulcrum brackets 2 and 3 secured, as is shown in Figure IV, to bosses 4 which are formed upon the interior of the base housing 1. The corresponding members of each pair of fulcrum brackets are connected together by means of bars 5 which are preferably formed integral with the fulcrum brackets. The distance between the fulcrums of the platform levers is thus readily and permanently fixed. One of the platform levers 6 is supported by means of knife edge pivots 7 upon the fulcrum brackets 2 with one of its ends extending into the right end of the base housing 1, the end being bifurcated and provided with load pivots 8, while the other end of the lever extends toward the left and is provided with load pivots 9, the load pivots 8 and 9 being equidistant from the fulcrum pivots 7.

Another lever 10 is supported by means of a knife edge pivot 11 on the fulcrum brackets 3, with one of its ends extending into the left end of the base housing 1, where it is provided with load pivots 12, and its other end extending toward the right, where it is provided with load pivots 13. The load pivots 12 and 13 of the lever 10 are equidistant from its fulcrum pivot. Supported upon the pivots 8 of the lever 6 and the pivots 13 of the lever 10 is a commodity-receiver supporting spider 14. It will be apparent as the description proceeds that the load pivots 8 and 13 remain in the same horizontal plane and the same distance apart throughout all the weighing movements of the scale mechanism. The spider 14 may, therefore, if desired, be supported directly upon the pivots 8 and 13. I prefer, however, to support the spider from one of the levers by means of links such as are shown at 15. It will be observed that the interposition of these links does not permit the spider 14 to swing or have any movement in addition to that caused when it is forced downwardly by the weight of a load.

Projecting upwardly from the spider 14 through an opening in the housing 1 is a stem 16 upon the upper end of which is secured a suitable commodity-receiver 17, and supported within the housing 1 beneath the spider 14 is a dash pot 18 adapted to contain oil or other fluid and having a plunger 19 which is suitably connected by means of a plunger stem 20 to the spider 14.

Supported by means of links 21 upon the load pivots 9 of the lever 6 and the load pivots 12 of the lever 10 is a spider 22 having a stem 23 which projects upwardly through an opening in the housing 1 and supports a weight-receiving platter 24.

Supported centrally of the base housing 1 is an upright housing 25 consisting of a column 26 expanded, as at 27, and terminating in a flat fan-shaped upper end 28. Secured to the lever 6 and extending upwardly into the expanded portion 27 of the housing 25 is a rigid arm 29, and secured to the lever 10 and extending upwardly into the expanded portion of the housing 27 is a similar rigid arm 30. Mounted at the upper ends of the arms 29 and 30 are vertically adjustable plugs 31 and 32, and connecting the plugs 31 and 32 by means of ball bearing joints 33 and 34 is a bar 35, the distance between the axes of the ball bearing joints 33 and 34 being the same as the distance between the fulcrum pivots 7 and 11, the load pivots 8 and 13 and the load pivots 9 and 12.

The mechanism so far described constitutes an even balance scale. If a load be placed in the commodity-receiver 17, the levers 6 and 10 will swing in a clockwise direction, the load pivots 8 and 13 remaining in the same horizontal plane. As the commodity-receiver 17 is forced downwardly by the weight of the load, the weight-receiving platter 24 will be elevated, but it will remain horizontal throughout its entire movement. The weight of the load in the commodity-receiver 17 may be counterbalanced by a like weight on the weight-receiving platter 24. The weight of the load will have the same effect regardless of its position in the commodity-receiver 17 and the counterbalancing weight will have the same effect regardless of its position on the weight-receiving platter 24. If the load and the counterbalancing weight are in the respective centers of the commodity-receiver and weight-receiving platter, no force will be transmitted through the bar 35. If the load and the counterbalancing weight are placed at the right sides of the commodity-receiver and weight-receiving platter respectively, there will be no force transmitted through the bar 35, and this will also be the case if the load and the counterbalancing weight are placed at the left sides of the commodity-receiver and weight-receiving platter respectively. If, however, the load be placed at the right side of the commodity-receiver and the counterbalancing weight be placed at the left side of the weight-receiving platter, some force will be transmitted through the bar 35.

For the purpose of facilitating manufacture, the levers 6 and 10 with the arms 29 and 30 may be of identical construction and reversely arranged as shown in Figures I and II, and the spiders, fulcrum brackets and other parts which are employed in pairs may also be of identical construction. If desired, however, one of the levers, preferably the lever 6, may be equipped with a tare beam 40, the tare beam supporting arms 41 and 42 projecting through suitable openings in the base housing 1. A loading box 43 may be placed upon the spider 22.

The automatic load-counterbalancing and indicating mechanism of the scale consists of a pendulum 44 equipped with an indicator hand 45 which co-operates with a chart 46 located in the fan-shaped upper end of the housing and visible from both sides of the scale through windows 47. Secured to the arm 30 is an extension 48 to which is connected a metallic ribbon 49 which overlies and is connected to a power sector 50, the power sector being eccentric to the axis of movement of the pendulum for the purpose of causing equal arcuate movements of the pendulum in counterbalancing equal increments of load on the commodity-receiver. The upper end of the extension 48 being considerably to the right of the axis of movement of the lever 10, the upper end of the extension swings downwardly and to the right as the lever swings in a clockwise direction.

When a load is placed in the commodity-receiver 17 the levers 6 and 10 swing in a clockwise direction, thus swinging the arm 30 and the extension 48 and exerting a pull upon the ribbon 49. Clockwise movement of the levers 6 and 10 continues until the pendulum 44 is swung to a position in which it counterbalances the load on the commodity-receiver and the weight of the load is indicated on the chart 46. Should it be desired to weigh a load beyond the capacity of the automatic mechanism, part of the load may be counterbalanced by weights upon the platter 24, the remainder being counterbalanced automatically by the pendulum 44.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a pair of levers each having a load pivot at each end, fulcrum pivots for said levers, a pair of load-receivers each resting upon adjacent load pivots of both levers, an upwardly extending arm fixed to each lever and having a pivot located substantially above the fulcrum pivot of its lever, and a bar connecting the pivots of said arms.

2. In a weighing scale, in combination, a base, a pair of levers fulcrumed on said base and having parallel axes of movement, each of said levers having a load pivot at each end, a pair of load-receivers each resting upon adjacent load pivots of both levers, an upright housing supported by said base between said load-receivers, an arm fixed to each of said levers and extending upwardly into said housing, each arm having a pivot located substantially above the fulcrum of its lever, and a bar connecting the pivots of said arms.

3. In a weighing scale, in combination, a base, a pair of equal arm levers of equal length fulcrumed upon said base to swing upon parallel axes, each of said levers having a load pivot at each of its ends, a pair of load-receivers each resting upon the adjacent load pivots of both levers, an upright housing on said base between said load-receivers, an arm fixed to each lever and extending upwardly within said housing, each of said arms having a pivot located substantially above the fulcrum of its lever, and a bar connecting the pivots of said arms.

4. In a weighing scale, in combination, a base, a pair of levers supported thereby to swing on parallel axes, each of said levers having load pivots at its ends, a pair of load-receivers, each of said load-receivers supported upon the adjacent load pivots of both levers, an upright housing between said load-receivers, each of said levers having an arm extending into said upright housing, a bar pivotally connecting said arms, the distance apart of the pivotal connections between said bar and said arms being substantially the same as the distance between the fulcrums of said levers, a load-counterbalancing pedulum supported by said housing, and means operatively connecting said levers and said load-counterbalancing pedulum.

5. In a weighing scale, in combination, a base, a pair of equal arm levers supported by said base to swing on parallel axes, each of said levers having load pivots at its ends, a pair of load-receivers each supported on adjacent pivots of both levers, an upright housing between said load-receivers, each of said levers having an arm fixed thereto, said arms extending upwardly within said housing, a bar pivotally connecting said arms, a load-counterbalancing pendulum supported by said housing, means connecting said pendulum and one of said arms, and indicating means operated by said pendulum.

CHARLES O. MARSHALL.